(12) United States Patent
Elez

(10) Patent No.: US 7,103,803 B2
(45) Date of Patent: Sep. 5, 2006

(54) METHOD FOR VERIFICATION OF COMMAND PROCESSING IN A COMPUTER SYSTEM DESIGN HAVING A MULTIPLE PRIORITY COMMAND QUEUE

(75) Inventor: Slavenko Elez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 10/754,205

(22) Filed: Jan. 8, 2004

(65) Prior Publication Data

US 2005/0160320 A1    Jul. 21, 2005

(51) Int. Cl.
*G06F 11/00* (2006.01)

(52) U.S. Cl. .............................. 714/33; 703/21; 703/22

(58) Field of Classification Search ...................... None
See application file for complete search history.

(56) References Cited

U.S. PATENT DOCUMENTS

| | | | | |
|---|---|---|---|---|
| 4,523,206 A | * | 6/1985 | Sasscer ........................ | 711/130 |
| 4,523,275 A | * | 6/1985 | Swenson et al. ................ | 714/7 |
| 4,530,054 A | * | 7/1985 | Hamstra et al. ............. | 711/133 |
| 6,035,424 A | * | 3/2000 | Freerksen et al. ............ | 714/40 |
| 6,055,579 A | * | 4/2000 | Goyal et al. ................. | 713/375 |
| 6,092,158 A | * | 7/2000 | Harriman et al. ........... | 711/151 |
| 6,195,724 B1 | * | 2/2001 | Stracovsky et al. ......... | 710/244 |
| 6,430,642 B1 | * | 8/2002 | Stracovsky et al. ......... | 710/244 |
| 2006/0106956 A1 | * | 5/2006 | Hillier et al. ................. | 710/40 |

* cited by examiner

*Primary Examiner*—Robert Beausoliel
*Assistant Examiner*—Amine Riad
(74) *Attorney, Agent, or Firm*—Schmeiser, Olsen & Watts; William H. Steinberg

(57) ABSTRACT

A method for verification of multiple priority command processing, including: inputting over time, multiple simulated requests into a simulation model of the computer system, each request having a priority and each request comprising a request and tag transaction, a command ID transaction, command system ID transaction, a system combined response transaction and a completion tag transaction; sorting the priority of each request based; issuing an error if any particular command ID transaction is not a transaction of a request previously sorted; issuing an error if any particular command system ID transaction is not a transaction of a request having a previously issued command ID transaction, if any particular system combined response transaction is not a transaction of a request having a previously issued command system ID transaction and if any particular completion tag transaction is not a transaction of a request having a previously issued system combined response transaction.

23 Claims, 7 Drawing Sheets

METHOD FOR VERIFICATION OF COMMAND PROCESSING IN A COMPUTER SYSTEM DESIGN HAVING A MULTIPLE PRIORITY COMMAND QUEUE

FIELD OF THE INVENTION

The present invention relates to the field of computer systems; more specifically, it relates to method and system for verification of command processing in a computer system design having a multiple priority command queue.

BACKGROUND OF THE INVENTION

In a multiprocessor computer system, requests for data (a data transfer) by each processor are processed by a bus interface unit, which receives or sends information relating to ensuring the correct data is sent (transferred) the correct processor. A data transfer transaction goes through several stages in the computer system before the data transfer transaction is complete. Since stages from different requests may be intermingled it is difficult to keep track of all request stages of all requests through the command processor of the computer system. It is especially difficult in systems that do not enforce strict command packet order or in systems that allow command packet retry. This difficulty translates into the design phase of a computer system, specifically the simulation and verification of the command issuing logic of the design phase. During simulation of the system design it must be verified that each data transfer completes and that the appropriate data is being sent to each processor in the system. Therefore, there is a need for method and system for verification of multiple priority issue queue data requests that is robust and independent of when various stages of a particular request occur in time during the simulation of a computer system design.

SUMMARY OF THE INVENTION

A first aspect of the present invention is a method for verification of command processing in a computer system design having a multiple priority command queue, the method comprising: (a) inputting over time, multiple simulated requests into a simulation model of the computer system, each request having a priority and each request comprising a stage (1) request and tag transaction, a stage (2) command ID transaction, a stage (3) command system ID transaction, a stage (5) system combined response transaction and a stage (7) completion tag transaction; (b) sorting the priority of each request based on the stage (1) request and tag transaction of each request; (c) issuing an error if any particular stage (2) command ID transaction is not a transaction of a request previously sorted in step (b) or is not a retry stage (2) command ID; (d) issuing an error or ignoring a particular stage (3) command system ID transaction if the particular stage (3) command system ID transaction is not a transaction of a request having a previously issued stage (2) command ID transaction; (e) issuing an error or ignoring a particular stage (5) system combined response if the particular stage (5) system combined response transaction is not a transaction of a request having a previously issued stage (3) command system ID transaction; and (f) issuing an error if any particular stage (7) completion tag transaction is not a transaction of a request having a previously issued stage (5) system combined response transaction.

A second aspect of the present invention is a method for verification of command processing in a computer system design having a multiple priority command queue, the method comprising: (a) inputting over time, multiple simulated requests into a simulation model of the computer system, each request having a priority and each request comprising a stage (1) request and tag transaction, a stage (2) command ID transaction, a stage (3) command system ID transaction, a stage (5) system combined response transaction and a stage (7) completion tag transaction; (b) entering into one of two or more priority lists a tag and a priority for each particular stage (1) request and tag transaction upon input of each particular stage (1) request and tag transaction; (c) moving an entry corresponding to each particular stage (2) command ID transaction from one of the two or more priority lists to an issued list upon input of each particular stage (2) command ID transaction of a request and writing a packet ID from the particular stage (2) command ID transaction to a packet ID field in the entry; (d) writing to a system ID field in an entry of the issued list corresponding to each particular stage (3) command system ID transaction, a system ID from the particular stage (3) command system ID transaction; (e) writing to a system combined response field in an entry of the issued list corresponding to each particular a stage (5) system combined response transaction, a system combined response; and (f) deleting from the issued list each entry corresponding to each stage (7) completion tag transaction.

A third aspect of the present invention is a computer system comprising a processor, an address/data bus coupled to the processor, and a computer-readable memory unit adapted to be coupled to the processor, the memory unit containing instructions that when executed by the processor implement a method for method for verification of command processing in a computer system design having a multiple priority command queue, the method comprising the computer implemented steps of: (a) inputting over time, multiple simulated requests into a simulation model of the computer system, each request having a priority and each request comprising a stage (1) request and tag transaction, a stage (2) command ID transaction, a stage (3) command system ID transaction, a stage (5) system combined response transaction and a stage (7) completion tag transaction; (b) entering into one of two or more priority lists a tag and a priority for each particular stage (1) request and tag transaction upon input of each particular stage (1) request and tag transaction; (c) moving an entry corresponding to each particular stage (2) command ID transaction from one of the two or more priority lists to an issued list upon input of each particular stage (2) command ID transaction of a request and writing a packet ID from the particular stage (2) command ID transaction to a packet ID field in the entry; (d) writing to a system ID field in an entry of the issued list corresponding to each particular stage (3) command system ID transaction, a system ID from the particular stage (3) command system ID transaction; (e) writing to a system combined response field in an entry of the issued list corresponding to each particular a stage (5) system combined response transaction, a system combined response; and (f) deleting from the issued list each entry corresponding to each stage (7) completion tag transaction.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

The present invention will be described using a two-priority command issue queue and a retry queue. However, the present invention is applicable to command issue queues of more than two priorities. A command in the context of the present invention is a request for data transfer. It should be kept in mind that the present invention operates on a simulation model of the hardware of a computer system during the design phase of the computer system and even though hardware nomenclature is used, it refers to a software model of the hardware unless otherwise noted.

Figure 1:
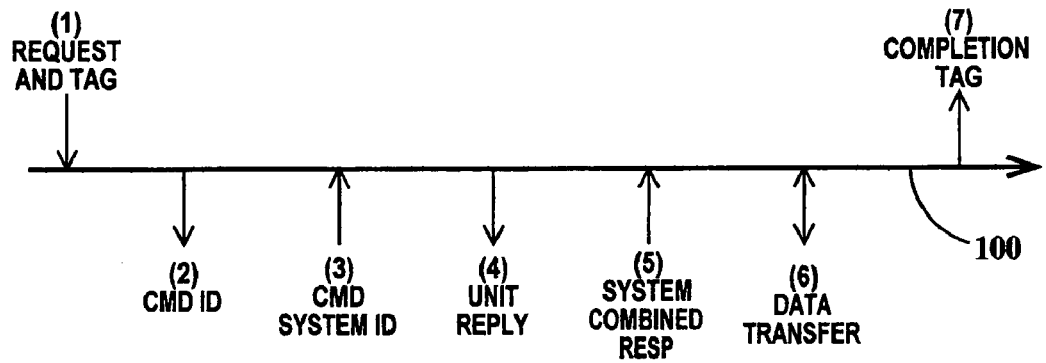
FIG. 1 is a schematic diagram illustrating the stages of a request transaction according to the present invention.

FIG. 1 is a schematic diagram illustrating the stages of a request transaction according to the present invention. In FIG. 1, seven transaction stages required to process a request are illustrated relative to a logical stage sequence relative to a bus interface unit within a multiprocessor system bus. Both the bus interface unit and the logical sequence are represented by a simulation time axis 100. Arrows pointing toward axis 100 represent input to the bus interface unit. Arrows pointing to and from axis 100 represent output from the bus interface unit. Arrows pointing to and from the axis 100 represent bi-directional transactions. The first transaction stage, request and tag, is a request for data from a processor and includes a request identifier (ID) or tag and request information such as priority type, data transfer size, memory address, etc. The second transaction stage, command ID, is the issuing of a command packet by the bus interface unit to the multiprocessor bus with a unique packet ID identifying the command packet uniquely. The third stage, command system ID, is a response from the system controller assigning to the command packet a system ID. Stage (3) command system ID, is a reflection of the stage (2) command ID with system ID and contains all the information of the stage (2) command ID (including the packet ID). The fourth stage, unit reply is an individual reply from each processor linked to a data bus that tell a bus controller whether the processor is to be involved in the data transfer, but is not used by the present invention and will not be discussed further. The fifth stage, system combined response, is a communication from the bus controller to the requesting processor that the target or source of the data was found and that data transfer can either proceed or that the target or source is too busy so that the request needs to be retried at a later time. The system combined response is created based on all individual replies in the stage (4) unit reply. The system ID is also included in the stage (5) system combined response. The sixth stage, stage (6) data transfer, is where actual transfer of requested data between the requester and the target occurs. This stage is also not used by the present invention. The seventh stage, stage (7) completion tag, is a response from the bust interface unit to the processor that the request has been completed.

The present invention will use simulated stages 1, 2, 3, 5 and 7 transactions from a simulated request queue to a simulated bus interface unit and then track and verify the issuance of request from the simulated request queue. While various stages of any particular requests can be intermingled with various stages of any number of other requests, the simulated sequential order of the stages of an individual request are maintained in stage 1 through stage 7 logical order in simulation time.

Figure 2:
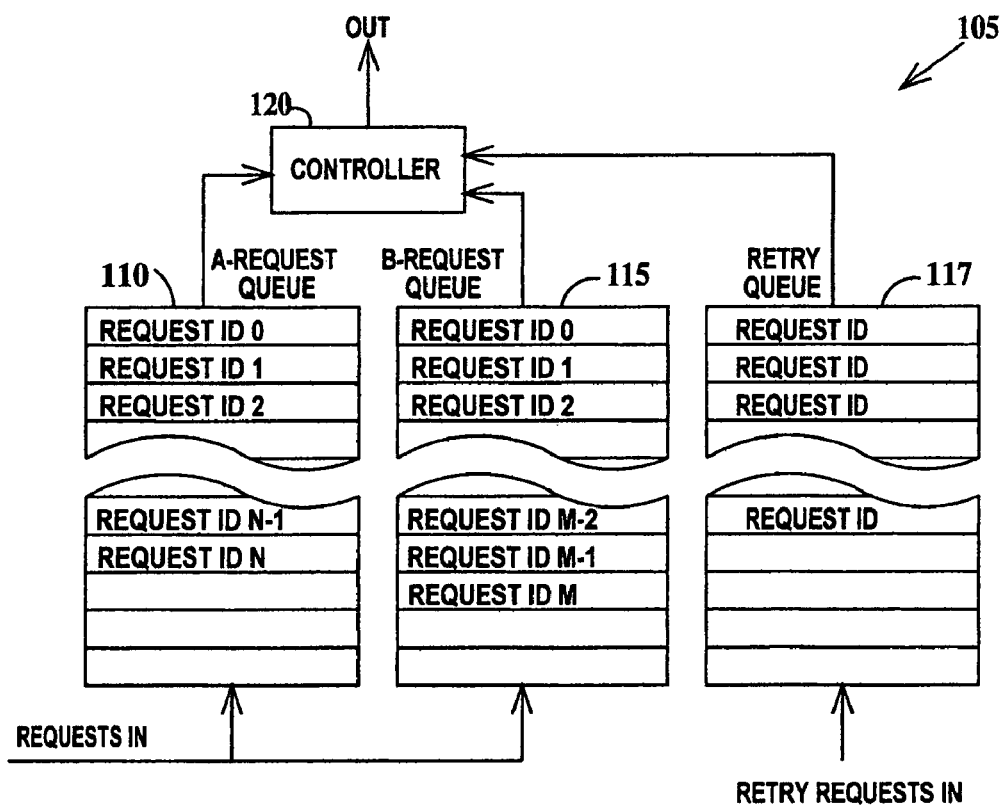
FIG. 2 is an exemplary request queue according to the present invention.

FIG. 2 is an exemplary request queue architecture according to the present invention. In FIG. 2 a command queue 105 includes an A-request queue 110 and a B-request queue 115, a retry queue 117 and a controller 120. In the present example, A-request queue 110 has a higher priority than B-request queue 115 and controller 120 is adapted to ensure (1) requests in retry queue 117 are periodically sent out even if there are requests in A-request queue 110 or B-request queue pending and (2) no request in B-request queue 115 is sent while there is still a request in A-request queue 110 pending. There may be more than two request queues, each having a different relative priority and that architecture of command queue 105 illustrated in FIG. 2 is but one example of a command queue that the present invention may be adapted to verify. A-request queue 110 includes multiple entry positions and multiple request ID 0 to ID N entries. B-request queue 115 includes entry positions and request ID 0 to ID M entries. Requests within A-request queue 110 and within B-request queue 115 are kept in (first in first out) FIFO order. Retry queue 117 is not FIFO and any request from the retry queue can be issued at any time. A-request queue 110, B-request queue 115 and retry queue 117 are part of the simulation model of the computer system under design.

During a simulation, a set of simulated requests is generated using a random request generator (or simulated requests may be generated by other means) and inputted into a simulation model of the computer system whose design is being verified. Part of the model is a command queue, the one illustrated in FIG. 2 and described supra being an example.

Figure 3:
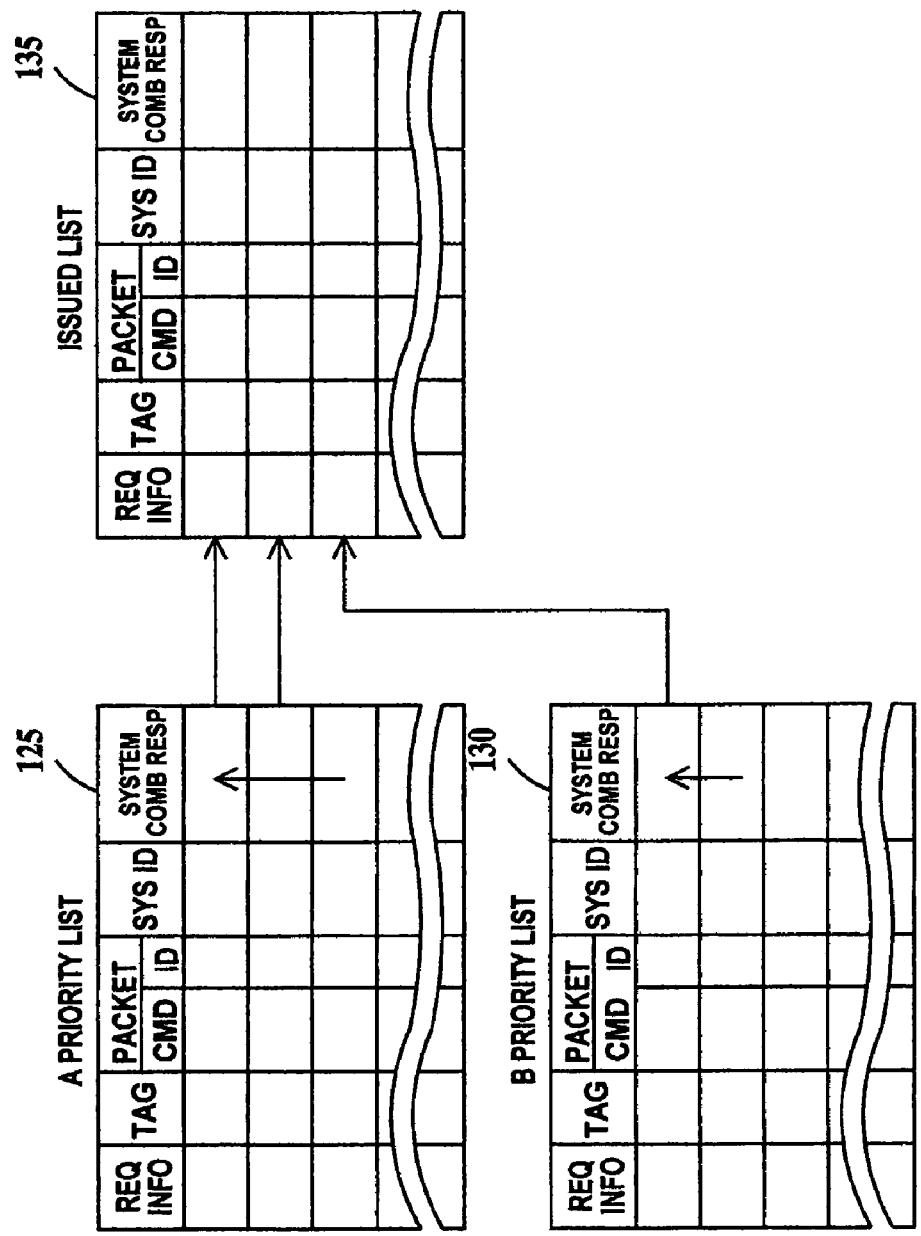
FIG. 3 is schematic diagram of tracking lists according to the present invention.

FIG. 3 is schematic diagram of tracking lists according to the present invention. In FIG. 3 there is an A-priority list 125, a B-priority list 130 and an issued list 135, which is a master list. Each list 125, 130 and 135 includes the following fields: a request information field, a tag field, a packet command field, a packet ID field, a system ID field and a system combined response field. While only the request and tag information are required in A-priority list 125 and B-priority list 130, in the present example, the structure of all three lists is kept the same to facilitate entry movement, especially when lists 125, 130 and 135 are "virtual" lists and are physically the same list either partitioned into three lists or a single list with an identifier for each request entry indicating whether the entry belongs to A-priority list 125, B-priority list 130 or issued list 135. Partitioning of requests into A-priority list 125, B-priority list 130 or issued list 135 is necessary in order to distinguish between a request that was already committed to the system bus controller or that is pending to be committed to the system bus controller. Partitioning is also necessary to keep track of priority.

Entries are either written to A-priority list 125 or B-priority list 130, moved respectively from a first position of the A-priority list or from a first position in B-priority list to issued list 135 or deleted from the issued list. When an entry is moved from A-priority list 125 to issued list 135 the remaining entries (if any) in the A-priority list are moved up one position. When an entry is moved from B-priority list 130 to issued list 135 the remaining entries (if any) in the B-priority list are moved up one position. When an entry is deleted from issued list 135 the remaining entries (if any) in the issued list are moved up one position. The top position in A-priority list 125 or B-priority list 130 should correspond to the next command packet (stage 2) issued from the respective request queues and this is in fact one of the verification checks performed by the present invention. A-priority list 125, B-priority list 130 and issued list 135 are part of the software implementation of the present invention.

Figure 4:
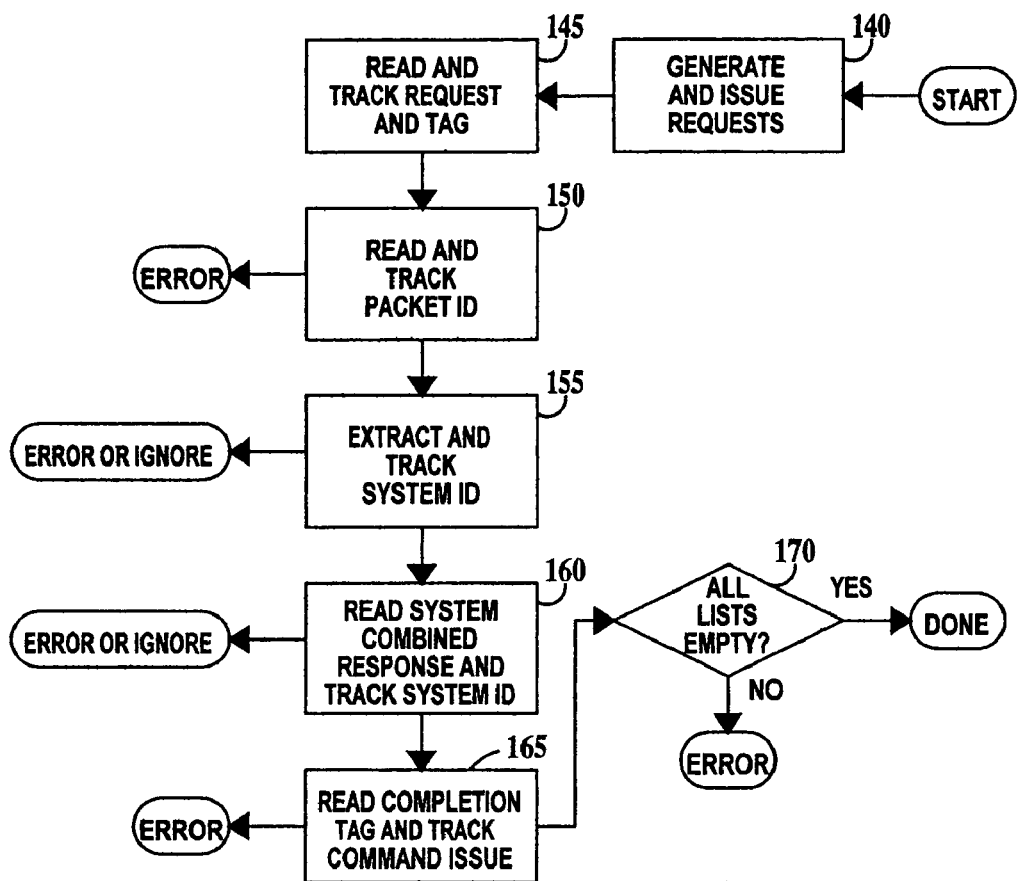
FIG. 4 is an overall flowchart for a method for verification of multiple priority issue queue request according to the present invention.

FIG. 4 is an overall flowchart for a method for verification of multiple priority issue queue request according to the present invention. In step 140, simulated data transfer requests as described supra are generated and inputted into the simulation model in random simulation time. The stages of the different requests may be intermingled due to the behavior of the system simulation model, but not due to the generation process itself. The requests are inputted throughout the simulation and the simulation ends when there are no further request inputs and all requests are supposed to be completed. In step 145, when the bus interface unit receives a stage (1) request and tag, the request information and tag are read and tracked by entering the request information and tag into either A-priority list 125 or B-priority list 130. Step 145 is illustrated in more detail in FIG. 5 and described infra. In step 150, when the bus interface unit issues a stage (2) command ID, the command packet ID is checked for existence in issued list 135 or by matching it to information in the first request of either A-priority list 125 (see FIG. 3) or B-priority list 130 (see FIG. 3) and then moving it to issued list 135 (see FIG. 3) or generating an error. Step 150 is illustrated in more detail in FIG. 6 and described infra. In step 155, when the bus interface unit receives a stage (3) command system ID, the system ID is extracted and verified by writing the system ID to a corresponding entry in issued list 135 (see FIG. 3) or generates an error or ignores the stage (3) command system ID. Step 155 is illustrated in more detail in FIG. 7 and described infra. In step 160, when the bus interface unit receives a stage (5) system combined response, the system ID is read and verified by writing the system combined response to issued list 135 (see FIG. 3) or generates an error or ignores the stage (5) system combined response. Step 160 is illustrated in more detail in FIG. 8 and described infra. In step 165, when the bus interface unit sends a stage (7) completion tag, the fulfillment of the original request is tracked and verified by deleting an entry with the matching tag entry is deleted from issued list 135 (see FIG. 3) or by generating an error. In step 170, after all requests have been inputted in step 140 and processed through steps 145 through 165, it is determined if all the tracking lists are empty. If all the tracking lists are empty, the verification and testing is complete otherwise an error is generated and the method may terminate or continue.

While each step in FIG. 4 is illustrated as occurring in the sequence of step 140, step 145, step 150, step 155, 160 and step 165, this is true only from the perspective of each stage of an individual request. Since overall, different stages of different requests are occurring randomly in simulation time and are intermingled, steps 140, 145, 150, 155, 160 and 165 are continually processing stage transactions. Verification is implemented by the generation of errors and corresponding error messages may be generated for each error condition.

Figure 5:
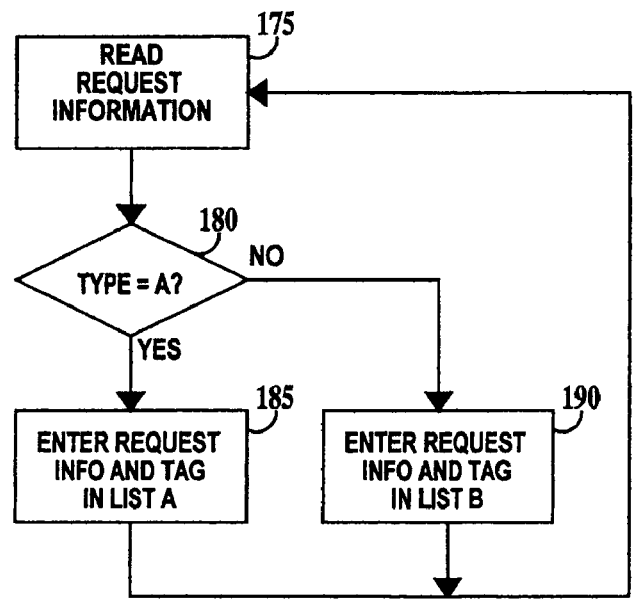
FIG. 5 is a flowchart illustrating the read and track request tag step of FIG. 4.

FIG. 5 is a flowchart illustrating the read and track request tag step 145 of FIG. 3. In step 175, when the bus interface unit receives a stage (1) request and tag, the current request information and tag is read, including the priority information. If in step 180, it is determined that the priority of the request is "A" then in step 185 the request information and tag are entered in an "A" priority list of the tracking lists (see FIG. 6) and the method loops to step 175 and waits for the next request, otherwise in step 190, the request information and tag are entered in a "B" priority list of the tracking lists (see FIG. 6) and the method loops to step 175 and waits for the next request.

Figure 6:
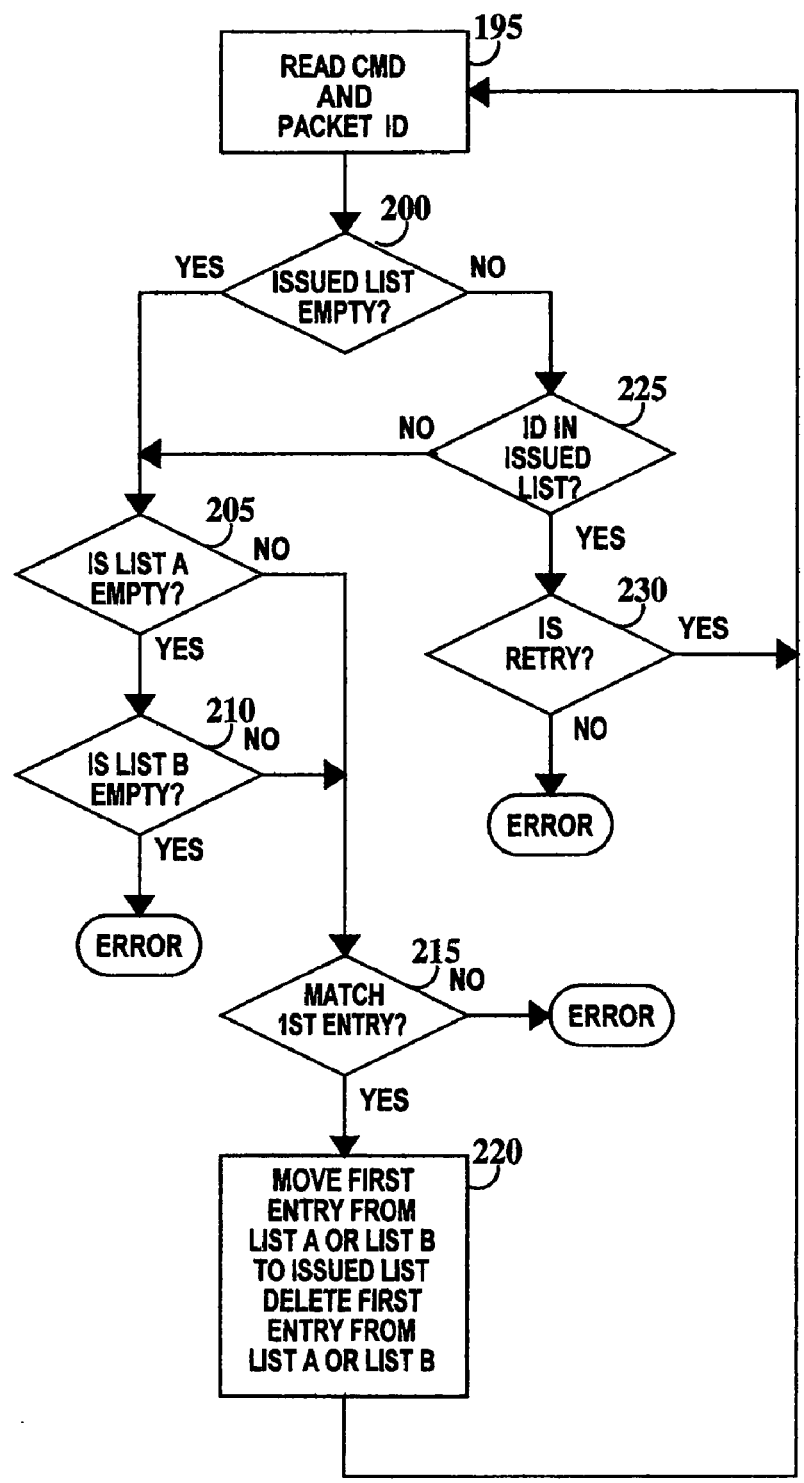
FIG. 6 is a flowchart illustrating the read and track packet ID step of FIG. 4.

FIG. 6 is a flowchart illustrating the read and track packet ID step 150 of FIG. 4. In step 195, when the bus interface unit issues a stage (2) command ID, the current command packet and packet ID are read. In step 200, it is determined if issued list 135 (see FIG. 3) is empty. If issued list 135 (see FIG. 3) is empty, then in step 205 it is determined if A-priority list 125 is empty. If A-priority list 125 (see FIG. 3) is empty, then in step 210 it is determined if B-priority list 130 (see FIG. 3) is empty. If B-priority list 130 is empty then an error is generated and the method may terminate or continue. If in step 205, A-priority list 125 (see FIG. 3) or if in step 210, B-priority list 130 (see FIG. 3) is not empty then the method proceeds to step 215. In step 215 it is determined if request information in the current command packet matches request information in a command packet in a first entry position of A-priority list 125 or if A-priority list 125 is empty, if the current command packet matches request information in a first entry position of B-priority list 130 (see FIG. 3). If the first entry matches then in step 220 the first entry is moved from either A-priority list 125 or B-priority list 130 (see FIG. 3), depending on which was not empty, to issued list 135 (see FIG. 3), the command and packet ID are written respectively to command and packet ID fields of the entry in issued list 135 and the method loops to step 195 otherwise an error is generated and the method may terminate or continue.

Returning to step 200, if in step 200 the issued list is not empty then in step 225, it is determined if the packet ID matches a packet ID in issued list 135 (see FIG. 3). If the packet ID does not match, then the method proceeds to step 205, otherwise the method proceeds to step 230. In step 230 it is determined if the current command packet is a retry of an already issued command packet by comparing the packet ID of the current command packet to the packet ID in the system combined response fields of issued list 135 (see FIG. 3). If a match is found, a retry is assumed and the method loops to step 195, otherwise an error is generated and the method may terminate or continue.

Figure 7:
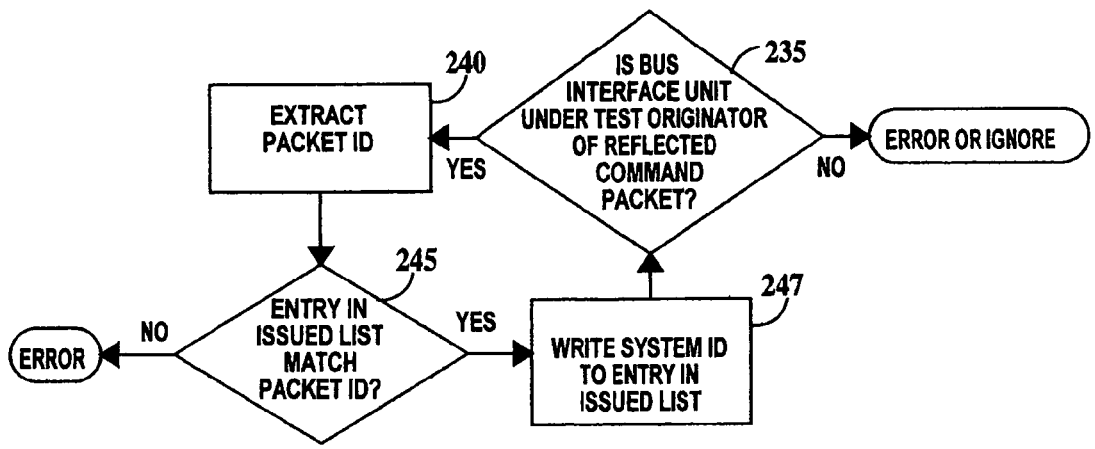
FIG. 7 is a flowchart illustrating the extract and track system ID step of FIG. 4.

FIG. 7 is a flowchart illustrating the extract and track system ID step 155 of FIG. 4. In step 235 it is determined if the bus interface unit under test is the originator of the reflected command packet of the current stage (3) command system ID. If the bus interface unit under test is the originator then the method proceeds to step 240, otherwise either an error is generated and the method may terminate or continue or the current stage (3) command system ID is ignored and the method continues. Whether an error is generated which may result in termination or whether the current stage (3) command system ID is ignored is determined from the system ID field and command content. In step 240, when the bus interface unit receives a stage (3) command system ID, the system ID is extracted from the current command packet using the packet ID contained in the command system ID as a cross-reference. In step 245 it is determined if the packet ID field of an entry in issued list 135 (see FIG. 3) matches the packet ID of the current stage (3) command system ID. If the current packet ID of the current stage (3) command system ID matches the packet ID in a packet ID field of issued list 135 (see FIG. 3) then in step 247, the system ID of stage (3) command system ID is written to the system ID field of the matching entry and the method loops to step 235.

Figure 8:
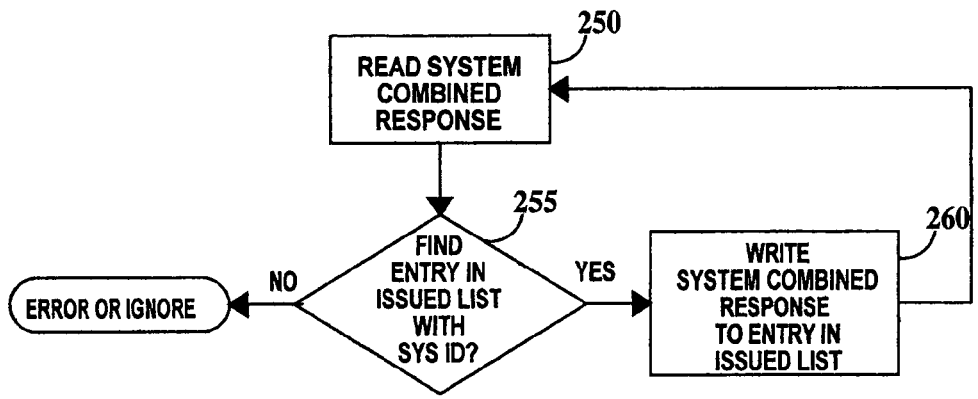
FIG. 8 is a flowchart illustrating the read system combined response and track system ID step of FIG. 4.

FIG. 8 is a flowchart illustrating the read system combined response and track system ID step 160 of FIG. 4. In step 250, when the bus interface unit receives a stage (5) system combined response, the system ID is read from the current system combined response. In step 255 it is determined if the system ID field of an entry in issued list 135 (see FIG. 3) matches the system ID contained in the current stage (5) system combined response. If the current system ID matches a system ID in a system ID field of issued list 135 (see FIG. 3) then in step 260, the system combined response of the current system combined response is written to the system combined response field of the matching entry and the method loops to step 250, otherwise either an error is generated and the method terminates or continues or the stage (5) system combined response is ignored and the methods loops to step 235. Whether an error is generated which may result in termination or whether the stage (5) system combined response is ignored is a function of specific system implementation or simulation environment.

Figure 9:
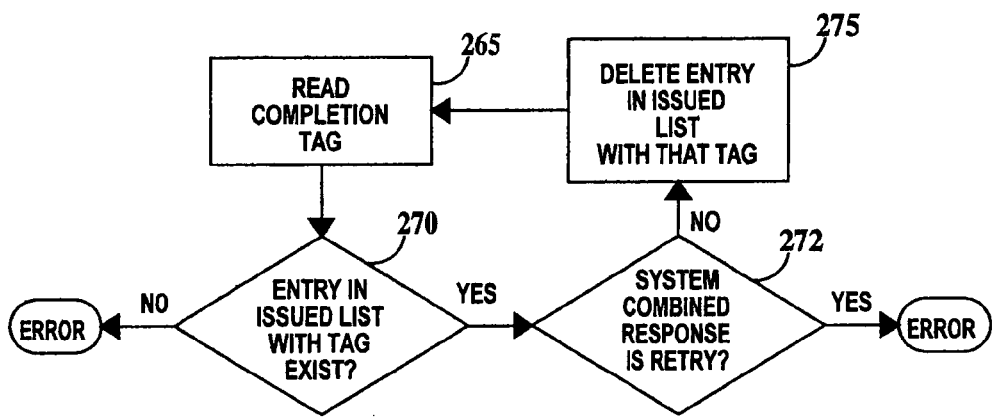
FIG. 9 is a flowchart illustrating the read completion tag and track command packet issue step of FIG. 4.

FIG. 9 is a flowchart illustrating the read completion tag and track command packet issue step 165 of FIG. 4. In step 265, when the bus interface unit sends a stage (7) completion tag, the fulfillment of the completion tag is read. In step 270 it is determined if the tag field of an entry in issued list 135 (see FIG. 3) matches the current completion tag. If the current completion tag matches a tag in a tag field of issued list 135 (see FIG. 3) then is step 272 it is determined if the stage (5) combined system reply corresponding to the current stage (7) completion tag is a retry. If the stage (5) combined system reply is not a retry then in step 275, the entry with the matching tag is deleted from issued list 135 (see FIG. 3) and the method loops to step 265, otherwise an error is generated and the method may terminate or continue. Returning to step 272, the stage (5) combined system reply is a retry then an error is generated and the method may terminate or continue.

Figure 10:
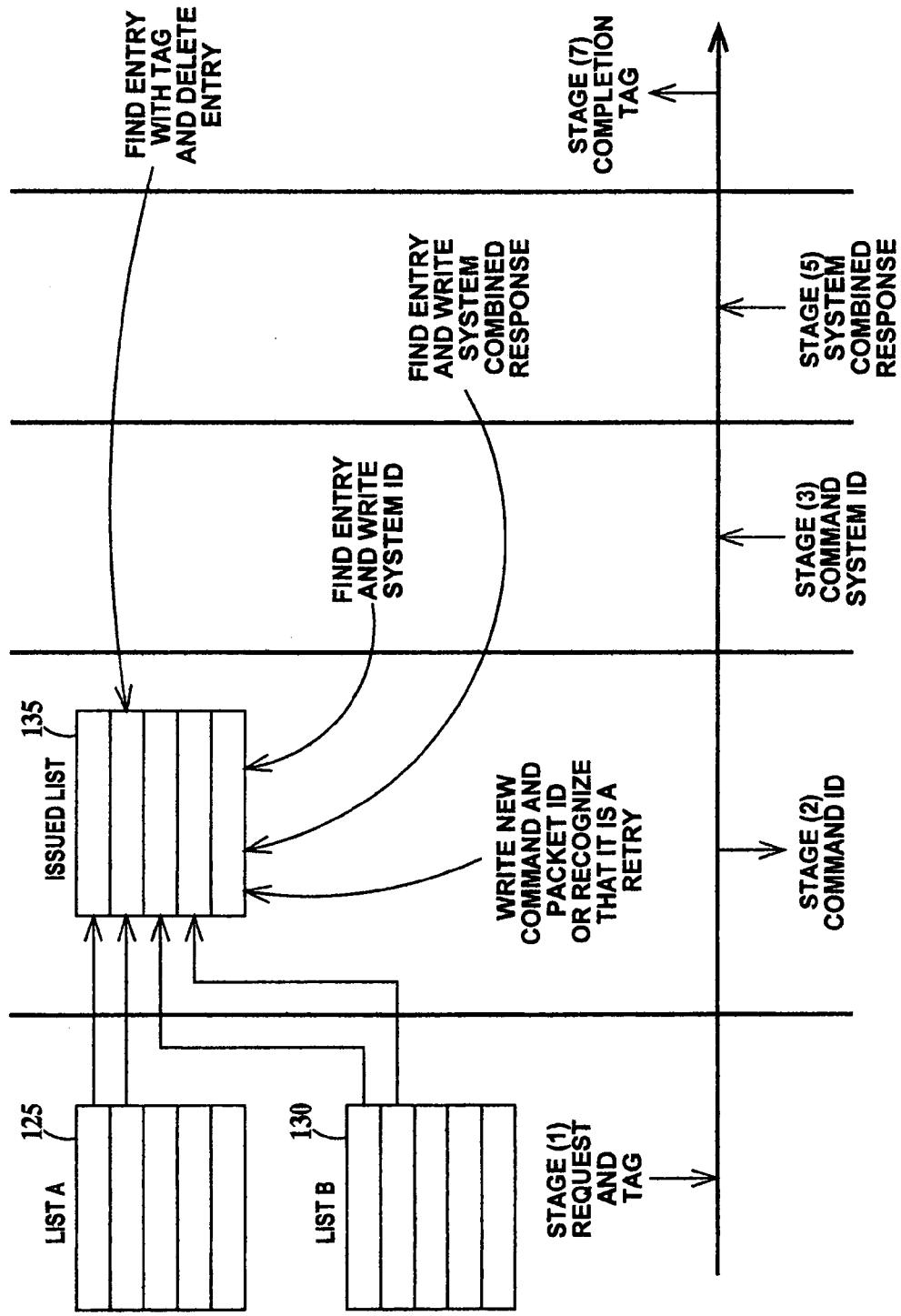
FIG. 10 is a schematic diagram illustrating the actions taken at the various stages of a request according to the present invention.

FIG. 10 is a schematic diagram illustrating the actions taken at the various stages of a request according to the present invention. In stage (1) request and tag, request information and the tag are added to A-priority list 125 or B-priority list 130 depending upon the priority of the request. In stage (2) command and ID, entries from A-priority list 125 and/or B-priority list 130 are moved to issued list 135 and the packet ID of the stage (2) command and ID is written to a packet ID field of issued list 130 or it is recognized that the stage (2) command and ID is a. In stage (3) command and system ID, a system ID is written to a system ID field in a matching entry in issued list 135. In stage (5) system combined response, the system combined response is written to a system combined response field of a matching entry in issued list 135. In stage (7) completion tag, a matching entry in issued list 135 is deleted from the issued list.

Generally, the method described herein with respect to method for verification of command processing of a computer system design having a multiple priority command queue is practiced with a general-purpose computer and the method may be coded as a set of instructions on removable or hard media for use by the general-purpose computer.

Figure 11:
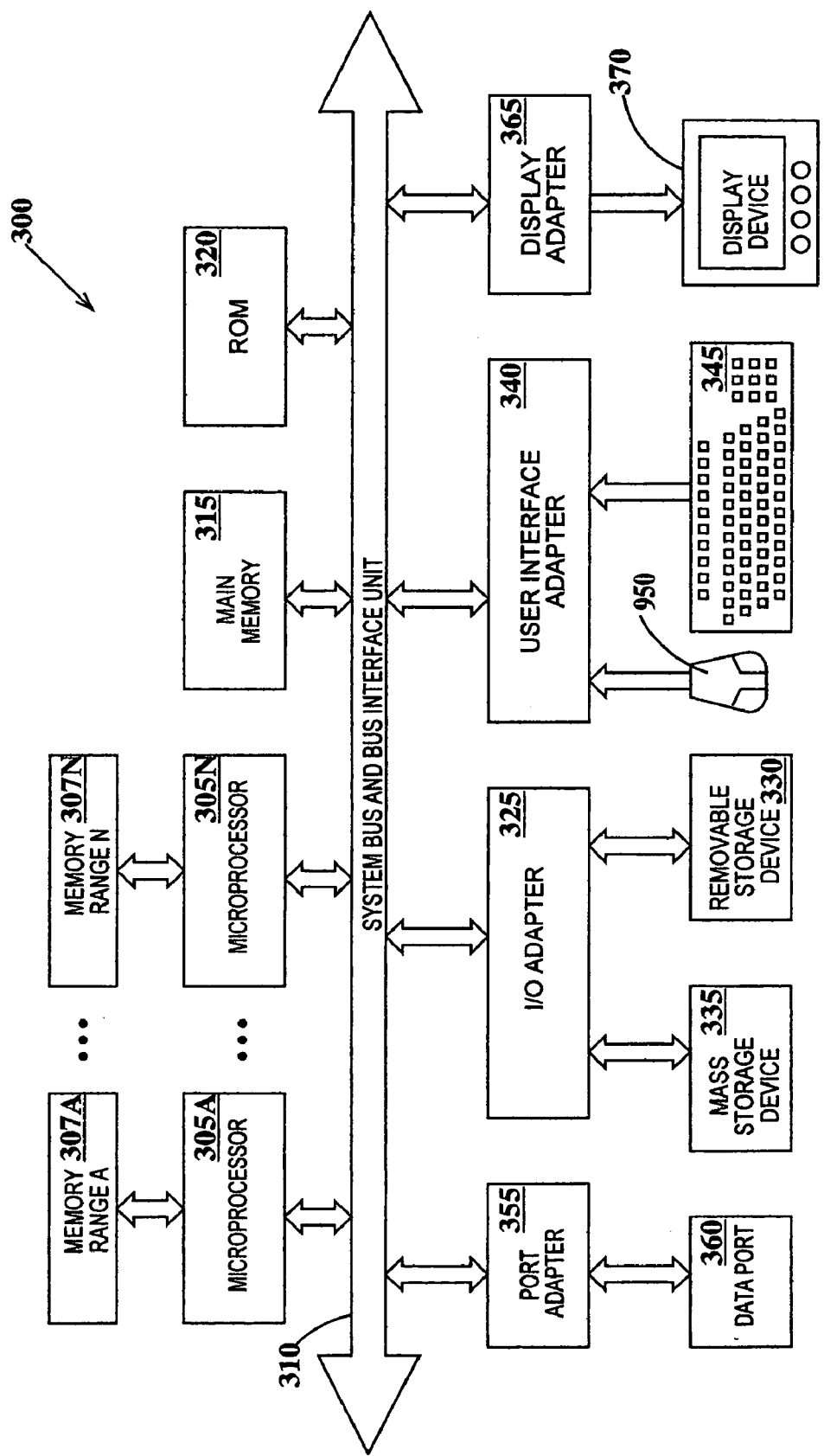
FIG. 11 is a schematic block diagram of a general-purpose computer illustrating the transactions of a computer system design verified by the present invention as well as illustrating a general-purpose computer for practicing the present invention.

FIG. 11 is a schematic block diagram of a general-purpose computer illustrating a computer system design verified by the present invention as well as illustrating a general-purpose computer for practicing the present invention. In FIG. 1, a computer system 300 has multiple processors 305A through 305N having reserved address ranges of memory 307A through 307N respectively. The actual physical memory associated with address ranges of memory 307A through 307N may be located in main memory, a cache memory within each processor 305A through 305N, or separate memory units associated with one or more processors. Processors 305A through 305N are is interconnected via a system bus 310 having a system bus interface unit to a main memory 315, a read-only memory (ROM) 320, an input/output (I/O) adapter 325 for a connecting a removable data and/or program storage device 330 and a mass data and/or program storage device 335, a user interface adapter 340 for connecting a keyboard 345 and a mouse 350, a port adapter 355 for connecting a data port 360 and a display adapter 365 for connecting a display device 370.

Processors 305A through 305B, corresponding address ranges of memory 307A through 307N, main memory 315 (having the command queue) and system bus and bus interface unit 310 are the physical units that are simulated by the computer model that the present invention verifies operation of. The computer system that implements the method of the present invention need only have a single processor, for example processor 305A.

ROM 320 contains the basic operating system for computer system 300. The operating system may alternatively reside in main memory 315 or elsewhere as is known in the art. Examples of removable data and/or program storage device 330 include magnetic media such as floppy drives and tape drives and optical media such as CD ROM drives. Examples of mass data and/or program storage device 335 include hard disk drives and non-volatile memory such as flash memory. In addition to keyboard 345 and mouse 350, other user input devices such as trackballs, writing tablets, pressure pads, microphones, light pens and position-sensing screen displays may be connected to user interface 340. Examples of display devices include cathode-ray tubes (CRT) and liquid crystal displays (LCD).

A computer program with an appropriate application interface may be created by one of skill in the art and stored on the system for programming the bus interface unit of system bus 310 to implement the present invention.

Thus, the present invention provides a method and system for verification of multiple priority issue queue data requests that is robust and independent of when various stages of a particular request occur in time during the simulation of a computer system design.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. For example, the method has been described wherein generation of an error may terminate or continue the method. However, in alternative embodiments the method may be allowed to continue upon generation of an error in some or all cases. Therefore it is intended that the following claims cover all such modifications and changes as fall within the true spirit and scope of the invention.

What is claimed is:

1. A method for verification of command processing in a computer system design having a multiple priority command queue, the method comprising:
   (a) inputting over time, multiple simulated requests into a simulation model of said computer system, each request having a priority and each request comprising a stage (1) request and tag transaction, a stage (2) command ID transaction, a stage (3) command system ID transaction, a stage (5) system combined response transaction and a stage (7) completion tag transaction;
   (b) sorting the priority of each request based on the stage (1) request and tag transaction of each request;
   (c) issuing an error if any particular stage (2) command ID transaction is not a transaction of a request previously sorted in step (b) or is not a retry stage (2) command ID;
   (d) issuing an error or ignoring a particular stage (3) command system ID transaction if said particular stage (3) command system ID transaction is not a transaction of a request having a previously issued stage (2) command ID transaction;
   (e) issuing an error or ignoring a particular stage (5) system combined response if said particular stage (5) system combined response transaction is not a transaction of a request having a previously issued stage (3) command system ID transaction; and
   (f) issuing an error if any particular stage (7) completion tag transaction is not a transaction of a request having a previously issued stage (5) system combined response transaction.

2. The method of claim 1, wherein in step (a):
   stage (1) request and tag transactions, stage (2) command ID transactions, stage (3) command system ID transactions, stage (5) system combined response transactions and stage (7) completion tag transactions of different requests are intermingled by said simulation model; and
   a stage (1) request and tag transaction, a stage (2) command ID transaction, a stage (3) command system ID transaction, a stage (5) system combined response transaction and a stage (7) completion tag transaction of a same request occur in the order listed.

3. The method of claim 1, wherein step (b) includes entering each stage (1) request and tag transaction of each request into one of two or more priority lists based on the priority of each request.

4. The method of claim 3, wherein step (c) includes moving an entry corresponding to said particular entry stage (2) command ID transaction from one of said two or more priority lists to an issued list and writing a packet ID transaction of said particular entry stage (2) command ID transaction to a corresponding field of the moved entry in said issued list.

5. The method of claim 4, wherein step (c) further includes:
   issuing an error if all priority lists and said issued list are empty;
   issuing an error if an entry in said issued list corresponding to said particular entry stage (2) command ID transaction is not flagged as a retry; and
   issuing an error if said particular entry stage (2) command ID transaction is not the first entry in one of said two or more priority lists.

6. The method of claim 4, wherein step (d) includes:
   writing a system ID transaction of said particular stage (3) command system ID transaction to a corresponding field in said corresponding entry of said issued list; and
   step (e) includes:
   writing said particular stage (5) system combined response transaction to a corresponding entry of said issued list;
   generating an error or ignoring said particular stage (3) command system ID if an entry corresponding to said particular stage (3) command system ID transaction does not exist in said issued list; and
   generating error an or ignoring said particular stage (5) system combined response if an entry corresponding to said particular stage (5) system combined response transaction does not exist in said issued list.

7. The method of claim 6, wherein step (e) further includes:
   removing an entry corresponding to said particular stage (7) completion tag transaction from said issued list; and
   generating an error if said corresponding entry does not exist in said issued list.

8. The method of claim 7, further including:
   (g) generating an error if said two or more priority lists and said issued list are not empty after all stage (1) request and tag transactions, all stage (2) command ID transactions, all stage (3) command system ID transactions, all stage (5) system combined response transactions and all stage (7) completion tag transactions of all said simulated requests have been inputted and processed by said simulation model.

9. The method of claim 1, wherein step (e) further includes generating an error if said particular stage (5) system combined response is a retry.

10. A method for verification of command processing in a computer system design having a multiple priority command queue, the method comprising:
    (a) inputting over time, multiple simulated requests into a simulation model of said computer system, each request having a priority and each request comprising a stage (1) request and tag transaction, a stage (2) command ID transaction, a stage (3) command system ID transaction, a stage (5) system combined response transaction and a stage (7) completion tag transaction;
    (b) entering into one of two or more priority lists a tag and a priority for each particular stage (1) request and tag transaction upon input of each particular stage (1) request and tag transaction;
    (c) moving an entry corresponding to each particular stage (2) command ID transaction from one of said two or more priority lists to an issued list upon input of each particular stage (2) command ID transaction of a request and writing a packet ID from said particular stage (2) command ID transaction to a packet ID field in said entry;
    (d) writing to a system ID field in an entry of said issued list corresponding to each particular stage (3) command system ID transaction, a system ID from said particular stage (3) command system ID transaction;
    (e) writing to a system combined response field in an entry of said issued list corresponding to each particular a stage (5) system combined response transaction, a system combined response; and (f) deleting from said issued list each entry corresponding to each stage (7) completion tag transaction.

11. The method of claim 10, wherein in step (a):

stage (1) request and tag transactions, stage (2) command ID transactions, stage (3) command system ID transactions, stage (5) system combined response transactions and stage (7) completion tag transactions of different requests are intermingled by said simulation model; and a stage (1) request and tag transaction, a stage (2) command ID transaction, a stage (3) command system ID transaction, a stage (5) system combined response transaction and a stage (7) completion tag transaction of a same request occur in the order listed.

12. The method of claim 10, wherein step (c) includes:

issuing an error if all priority lists and said issued list are empty;

issuing an error if an entry in said issued list corresponding to said particular entry stage (2) command ID transaction is not flagged as a retry; and issuing an error if said particular entry stage (2) command ID transaction is not a first entry in one of said two or more priority lists.

13. The method of claim 10, wherein step (d) includes:

issuing an error or ignoring a particular stage (3) command system ID transaction if a packet ID of said particular stage (3) command system ID transaction does not match a packet ID in said issued list.

14. The method of claim 10, wherein step (e) includes:

issuing an error or ignoring any particular stage (5) system combined if a system ID of said any particular stage (5) system combined response does not match a system ID in said issued list.

15. The method of claim 10, wherein step (f) includes:

issuing an error if a tag of said particular stage (7) completion tag transaction does not match a tag in said issued list.

16. The method of claim 10, further including:

(g) generating an error if said two or more priority lists and said issued list are not empty after all stage (1) request and tag transactions, all stage (2) command ID transactions, all stage (3) command system ID transactions, all stage (5) system combined response transactions and all stage (7) completion tag transactions of all said simulated requests have been inputted and processed by said simulation model.

17. A computer system comprising a processor, an address/data bus coupled to said processor, and a computer-readable memory unit adapted to be coupled to said processor, said memory unit containing instructions that when executed by said processor implement a method for verification of command processing in a computer system design having a multiple priority command queue, said method comprising the computer implemented steps of:

(a) inputting over time, multiple simulated requests into a simulation model of said computer system, each request having a priority and each request comprising a stage (1) request and tag transaction, a stage (2) command ID transaction, a stage (3) command system ID transaction, a stage (5) system combined response transaction and a stage (7) completion tag transaction;

(b) entering into one of two or more priority lists a tag and a priority for each particular stage (1) request and tag transaction upon input of each particular stage (1) request and tag transaction;

(c) moving an entry corresponding to each particular stage (2) command ID transaction from one of said two or more priority lists to an issued list upon input of each particular stage (2) command ID transaction of a request and writing a packet ID from said particular stage (2) command ID transaction to a packet ID field in said entry;

(d) writing to a system ID field in an entry of said issued list corresponding to each particular stage (3) command system ID transaction, a system ID from said particular stage (3) command system ID transaction;

(e) writing to a system combined response field in an entry of said issued list corresponding to each particular a stage (5) system combined response transaction, a system combined response; and (f) deleting from said issued list each entry corresponding to each stage (7) completion tag transaction.

18. The system of claim 17, wherein in method step (a):

stage (1) request and tag transactions, stage (2) command ID transactions, stage (3) command system ID transactions, stage (5) system combined response transactions and stage (7) completion tag transactions of different requests are intermingled by said simulation model; and a stage (1) request and tag transaction, a stage (2) command ID transaction, a stage (3) command system ID transaction, a stage (5) system combined response transaction and a stage (7) completion tag transaction of a same request occur in the order listed.

19. The system of claim 17, wherein method step (c) includes:

issuing an error if all priority lists and said issued list are empty;

issuing an error if an entry in said issued list corresponding to said particular entry stage (2) command ID transaction is not flagged as a retry; and issuing an error if said particular entry stage (2) command ID transaction is not the first entry in one of said two or more priority lists.

20. The system of claim 17, wherein method step (d) includes:

issuing an error or ignoring a particular stage (3) command system ID transaction if a packet ID of said particular stage (3) command system ID transaction does not match a packet ID in said issued list.

21. The method of claim 17, wherein method step (e) includes:

issuing an error or ignoring any particular stage (5) system combined response if a system ID of said any particular stage (5) system combined response does not match a system ID in said issued list.

22. The system of claim 17, wherein method step (f) includes:

issuing an error or ignoring a particular stage (7) completion tag transaction if a tag of said particular stage (7) completion tag transaction does not match a tag in said issued list.

23. The system of claim 17, further including the method steps of:

(g) generating an error if said two or more priority lists and said issued list are not empty after all stage (1) request and tag transactions, all stage (2) command ID transactions, all stage (3) command system ID transactions, all stage (5) system combined response transactions and all stage (7) completion tag transactions of all said simulated requests have been inputted and processed by said simulation model.

* * * * *

UNITED STATES PATENT AND TRADEMARK OFFICE
CERTIFICATE OF CORRECTION

| | | |
|---|---|---|
| PATENT NO. | : 7,103,803 B2 | Page 1 of 1 |
| APPLICATION NO. | : 10/754205 | |
| DATED | : September 5, 2006 | |
| INVENTOR(S) | : Slavenko | |

It is certified that error appears in the above-identified patent and that said Letters Patent is hereby corrected as shown below:

<u>Column 12</u>
Line 44, delete "The method of claim 17" and insert -- The system of claim 17 --

Signed and Sealed this

Twenty-first Day of November, 2006

JON W. DUDAS
*Director of the United States Patent and Trademark Office*